US010639989B2

(12) United States Patent
Kondo et al.

(10) Patent No.: US 10,639,989 B2
(45) Date of Patent: May 5, 2020

(54) FOUR-WHEEL-DRIVE VEHICLE CONTROL DEVICE

(71) Applicant: JTEKT CORPORATION, Osaka-shi (JP)

(72) Inventors: Hirokazu Kondo, Takahama (JP); Tomoaki Kato, Kariya (JP); Akiyoshi Kakita, Toyota (JP); Kotaro Sarai, Nishio (JP)

(73) Assignee: JTEKT CORPORATION, Osaka-shi (JP)

( * ) Notice: Subject to any disclaimer, the term of this patent is extended or adjusted under 35 U.S.C. 154(b) by 134 days.

(21) Appl. No.: 15/704,091

(22) Filed: Sep. 14, 2017

(65) Prior Publication Data

US 2018/0079301 A1    Mar. 22, 2018

(30) Foreign Application Priority Data

Sep. 16, 2016 (JP) ................................. 2016-181514

(51) Int. Cl.
*B60K 23/08* (2006.01)
*B60K 17/35* (2006.01)
(Continued)

(52) U.S. Cl.
CPC .......... *B60K 23/0808* (2013.01); *B60K 17/02* (2013.01); *B60K 17/35* (2013.01);
(Continued)

(58) Field of Classification Search
CPC ... B60K 2023/085; B60K 17/02; B60K 17/35
See application file for complete search history.

(56) References Cited

U.S. PATENT DOCUMENTS 6,617,704 B2 * 9/2003 Tomikawa ............... B60K 6/52
290/400
6,769,526 B2 * 8/2004 Iida ...................... B60W 10/119
192/82 T (Continued)

FOREIGN PATENT DOCUMENTS

DE    10 2006 022 858 A1    11/2007
DE    10 2009 032 265 A1    1/2011
(Continued)

OTHER PUBLICATIONS

Extended European Search Report dated Feb. 21, 2018 in Patent Application No. 17191008.6.

*Primary Examiner* — Joseph M Rocca
*Assistant Examiner* — Harold Eric Pahlck, III
(74) *Attorney, Agent, or Firm* — Oblon, McClelland, Maier & Neustadt, L.L.P.

(57) ABSTRACT

A control device is mounted on a four-wheel-drive vehicle, and includes a detector and a vibration suppression controller. The detector detects the occurrence of a vibrating state, in which drive wheels and auxiliary drive wheels slip alternately in a four-wheel-drive state in which a drive force is transferred to the auxiliary drive wheels, or the occurrence of a preliminary state for the vibrating state. The vibration suppression controller reduces the drive force which is transferred to the auxiliary drive wheels via a drive force transfer device when the vibrating state or the preliminary state is detected by the detector. The vibration suppression controller reduces the drive force which is transferred to the auxiliary drive wheels on condition that a thermal load of the drive force transfer device is less than a predetermined threshold.

4 Claims, 5 Drawing Sheets

(51) Int. Cl.
*B60K 17/02* (2006.01)
*B60W 10/04* (2006.01)
*B60W 10/119* (2012.01)
*B60W 30/20* (2006.01)

(52) U.S. Cl.
CPC ...... *B60K 2023/0858* (2013.01); *B60W 10/04* (2013.01); *B60W 10/119* (2013.01); *B60W 30/20* (2013.01); *B60Y 2400/424* (2013.01)

(56) References Cited

U.S. PATENT DOCUMENTS

| | | | | |
|---|---|---|---|---|
| 7,630,812 | B2* | 12/2009 | Jiang | F16D 48/066 |
| | | | | 477/174 |
| 8,095,288 | B2* | 1/2012 | Bruns | B60K 23/0808 |
| | | | | 701/67 |
| 8,197,386 | B2* | 6/2012 | Capito | B60K 23/0808 |
| | | | | 477/70 |
| 2016/0039403 | A1 | 2/2016 | Kato | |

FOREIGN PATENT DOCUMENTS

| | | |
|---|---|---|
| JP | 2008-184980 | 8/2008 |
| JP | 2010-188774 A | 9/2010 |

* cited by examiner

FOUR-WHEEL-DRIVE VEHICLE CONTROL DEVICE

INCORPORATION BY REFERENCE

The disclosure of Japanese Patent Application No. 2016-181514 filed on Sep. 16, 2016 including the specification, drawings and abstract, is incorporated herein by reference in its entirety.

BACKGROUND OF THE INVENTION

1. Field of the Invention

The present invention relates to a four-wheel-drive vehicle control device, and in particular to a control device that controls a drive force transfer device that transfers a drive force to auxiliary drive wheels.

2. Description of the Related Art

There has hitherto been a four-wheel-drive vehicle control device mounted on a four-wheel-drive vehicle that has main drive wheels (e.g. front wheels) to which a drive force of a drive source such as an engine is always transferred and auxiliary drive wheels (e.g. rear wheels) to which a drive force of the drive source is transferred via a drive force transfer device that can adjust transfer torque. The four-wheel-drive vehicle control device controls the drive force transfer device in accordance with the vehicle travel state such as a wheel speed and a steering angle. In the four-wheel-drive vehicle control device, a four-wheel-drive state is established by enhancing transfer torque of the drive force transfer device when the vehicle starts on a road surface with a low friction coefficient such as an icy road and a compacted snow road. See Japanese Patent Application Publication No. 2008-184980 (JP 2008-184980 A), for example.

When the vehicle starts in the four-wheel-drive state, the drive force is distributed to the front and rear wheels to suppress the occurrence of slip. When slip occurs at the front wheels or the rear wheels when the vehicle starts in the four-wheel-drive state, however, a vibrating state in which the wheel speed of the front wheels and the wheel speed of the rear wheels are alternately increased may be caused. JP 2008-184980 A discloses suppressing self-excited vibration, in which the wheel speed of the main drive wheels and the wheel speed of the auxiliary drive wheels are alternately increased, by controlling engine torque or a braking force when the vehicle starts on a road surface with a low friction coefficient and self-excited vibration occurs.

As described above, it is possible to gradually reduce self-excited vibration by controlling engine torque or a braking force or transfer torque of the drive force transfer device when self-excited vibration occurs. When the vehicle starts after self-excited vibration is gradually reduced, however, self-excited vibration may occur again. If self-excited vibration repeatedly occurs in this way, a clutch or the like that transfers torque in the drive force transfer device may be heated.

SUMMARY OF THE INVENTION

It is an object of the present invention to provide a four-wheel-drive vehicle control device that can prevent damage, due to a thermal load, to a drive force transfer device that transfers a drive force to auxiliary drive wheels even if a vibrating state in which main drive wheels and the auxiliary drive wheels slip alternately occurs when the vehicle starts on a road surface with a low friction coefficient.

An aspect of the present invention provides a four-wheel-drive vehicle control device mounted on a four-wheel-drive vehicle that has main drive wheels, to which a drive force of a drive source of the vehicle is always transferred, and auxiliary drive wheels, to which a drive force of the drive source is transferred via a drive force transfer device so as to be adjustable in accordance with a travel state of the vehicle, and the four-wheel-drive vehicle control device controls the drive force transfer device.

The four-wheel-drive vehicle control device includes:

a detector that detects occurrence of a vibrating state, in which the main drive wheels and the auxiliary drive wheels slip alternately in a four-wheel-drive state in which a drive force is transferred to the auxiliary drive wheels, or occurrence of a preliminary state, in which the vibrating state may occur, and a vibration suppression controller that reduces the drive force which is transferred to the auxiliary drive wheels via the drive force transfer device when the vibrating state or the preliminary state is detected by the detector.

The vibration suppression controller reduces the drive force which is transferred to the auxiliary drive wheels on condition that a thermal load of the drive force transfer device is less than a predetermined threshold.

With the four-wheel-drive vehicle control device according to the above aspect, it is possible to prevent damage, due to a thermal load, to a drive force transfer device that transfers a drive force to auxiliary drive wheels even if a vibrating state in which main drive wheels and the auxiliary drive wheels slip alternately occurs when the vehicle starts on a road surface with a low friction coefficient.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

An embodiment of the present invention will be described with reference to FIGS. 1 to 5.

Figure 1:
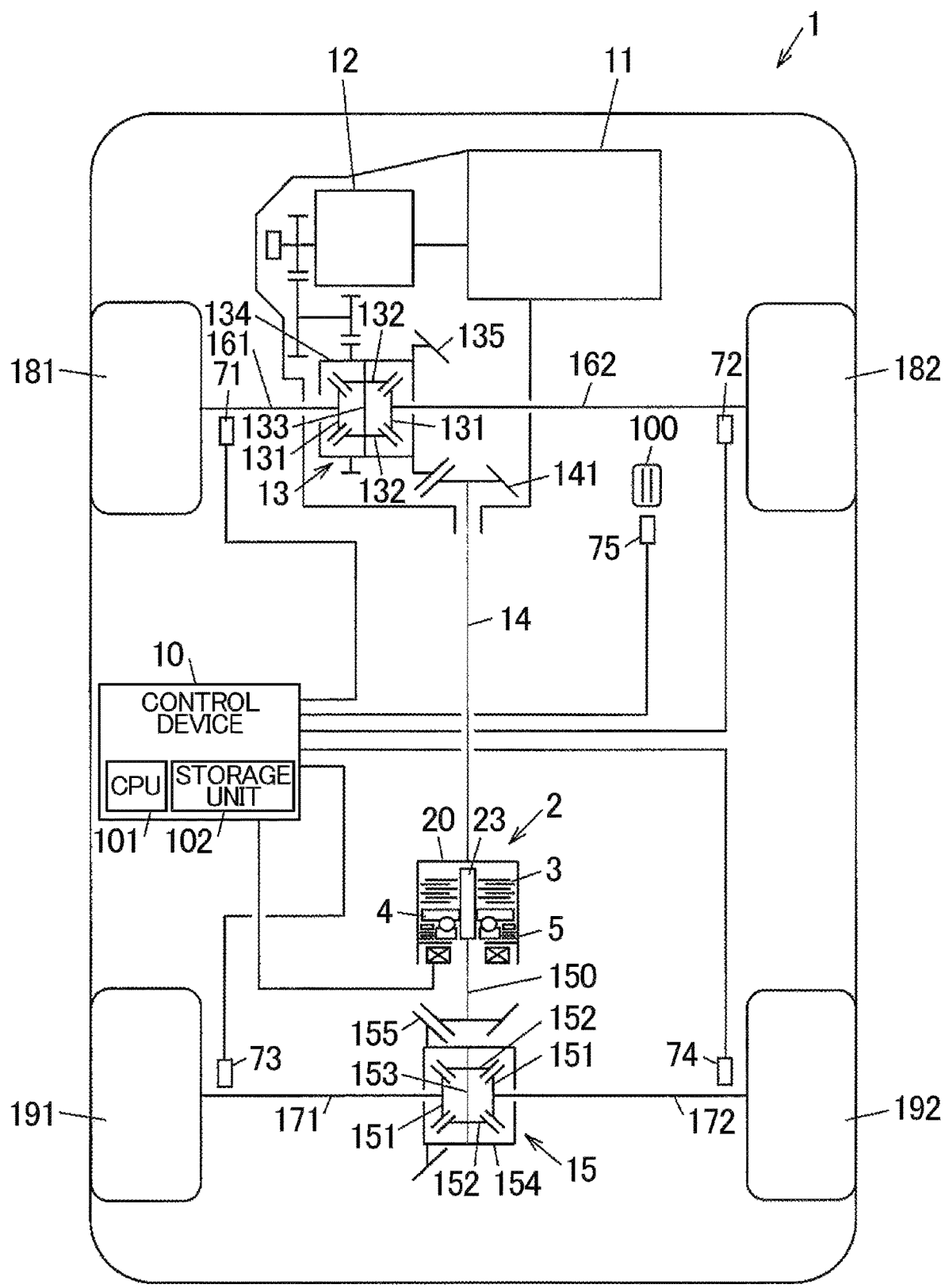
FIG. 1 is a schematic diagram schematically illustrating an example of the configuration of a four-wheel-drive vehicle on which a drive force transfer device according to an embodiment of the present invention is mounted.

FIG. 1 is a schematic diagram schematically illustrating an example of the configuration of a four-wheel-drive vehicle on which a drive force transfer device according to an embodiment of the present invention is mounted.

As illustrated in FIG. 1, a four-wheel-drive vehicle 1 includes an engine 11, a transmission 12, right and left front wheels 182 and 181, and right and left rear wheels 192 and 191. The engine 11 serves as a drive source that generates torque for travel. The transmission 12 varies the speed of an output from the engine 11. The right and left front wheels 182 and 181 serve as main drive wheels to which a drive force of the engine 11 is always transferred after the speed of the drive force has been varied by the transmission 12. The right and left rear wheels 192 and 191 serve as auxiliary drive wheels to which a drive force of the engine 11 is transferred in accordance with the travel state of the four-wheel-drive vehicle 1. The four-wheel-drive vehicle 1 is switchable between a four-wheel-drive state, in which a drive force of the engine 11 is transferred to the right and left front wheels 182 and 181 and the right and left rear wheels 192 and 191, and a two-wheel-drive state, in which a drive force is transferred to only the right and left front wheels 182 and 181.

The four-wheel-drive vehicle 1 also includes, mounted thereon, a front differential 13, a propeller shaft 14, a rear differential 15, right and left front-wheel drive shafts 162 and 161, right and left rear-wheel drive shafts 172 and 171, a drive force transfer device 2 disposed between the propeller shaft 14 and the rear differential 15, and a control device 10 that controls the drive force transfer device 2.

The control device 10 can acquire the results of detection by rotational speed sensors 72, 71, 74, and 73 that detect the respective rotational speeds of the right and left front wheels 182 and 181 and the right and left rear wheels 192 and 191 and an accelerator pedal sensor 75 that detects the amount by which an accelerator pedal 100 is depressed, and controls the drive force transfer device 2 on the basis of such detection results. More specifically, the control device 10 controls the drive force transfer device 2 such that a larger drive force is transferred to the right and left rear wheels 192 and 191 as the difference between the average rotational speed of the right and left front wheels 182 and 181 and the average rotational speed of the right and left rear wheels 192 and 191 is larger and as the amount by which the accelerator pedal 100 is depressed is larger.

The control device 10 computes instruction torque to be transferred by the drive force transfer device 2 on the basis of the results of detection by the rotational speed sensors 71 to 74 and the accelerator pedal sensor 75, and supplies the drive force transfer device 2 with an exciting current that matches the instruction torque. The drive force transfer device 2 transfers a drive force that matches the exciting current from the propeller shaft 14 toward the rear differential 15. The control device 10 can adjust a drive force transferred to the right and left rear wheels 192 and 191 via the drive force transfer device 2 by increasing and decreasing the exciting current through PWM control, for example.

A drive force of the engine 11 is transferred to the right and left front wheels 182 and 181 via the transmission 12, the front differential 13, and the right and left front-wheel drive shafts 162 and 161. The front differential 13 has a pair of side gears 131, a pair of pinion gears 132, a pinion gear shaft 133, and a front differential case 134. The side gears 131 are coupled to the right and left front-wheel drive shafts 162 and 161 so as not to be relatively rotatable. The pinion gears 132 are meshed with the side gears 131 with their gear shafts orthogonal to each other. The pinion gear shaft 133 supports the pinion gears 132. The front differential case 134 houses the side gears 131, the pinion gears 132, and the pinion gear shaft 133.

A ring gear 135 is fixed to the front differential case 134. The ring gear 135 is meshed with a pinion gear 141 provided at an end portion of the propeller shaft 14 on the front side of the vehicle. An end portion of the propeller shaft 14 on the rear side of the vehicle is coupled to a housing 20 of the drive force transfer device 2. The drive force transfer device 2 has an inner shaft 23 disposed so as to be rotatable relative to the housing 20, and transfers a drive force that matches the exciting current which is supplied from the control device 10 to the rear differential 15 via a pinion gear shaft 150 coupled to the inner shaft 23 so as not to be relatively rotatable. The drive force transfer device 2 will be discussed in detail later.

The rear differential 15 has a pair of side gears 151, a pair of pinion gears 152, a pinion gear shaft 153, a rear differential case 154, and a ring gear 155. The side gears 151 are coupled to the right and left rear-wheel drive shafts 172 and 171 so as not to be relatively rotatable. The pinion gears 152 are meshed with the side gears 151 with their gear shafts orthogonal to each other. The pinion gear shaft 153 supports the pinion gears 152. The rear differential case 154 houses the side gears 151, the pinion gears 152, and the pinion gear shaft 153. The ring gear 155 is fixed to the rear differential case 154, and meshed with the pinion gear shaft 150.

Figure 2:
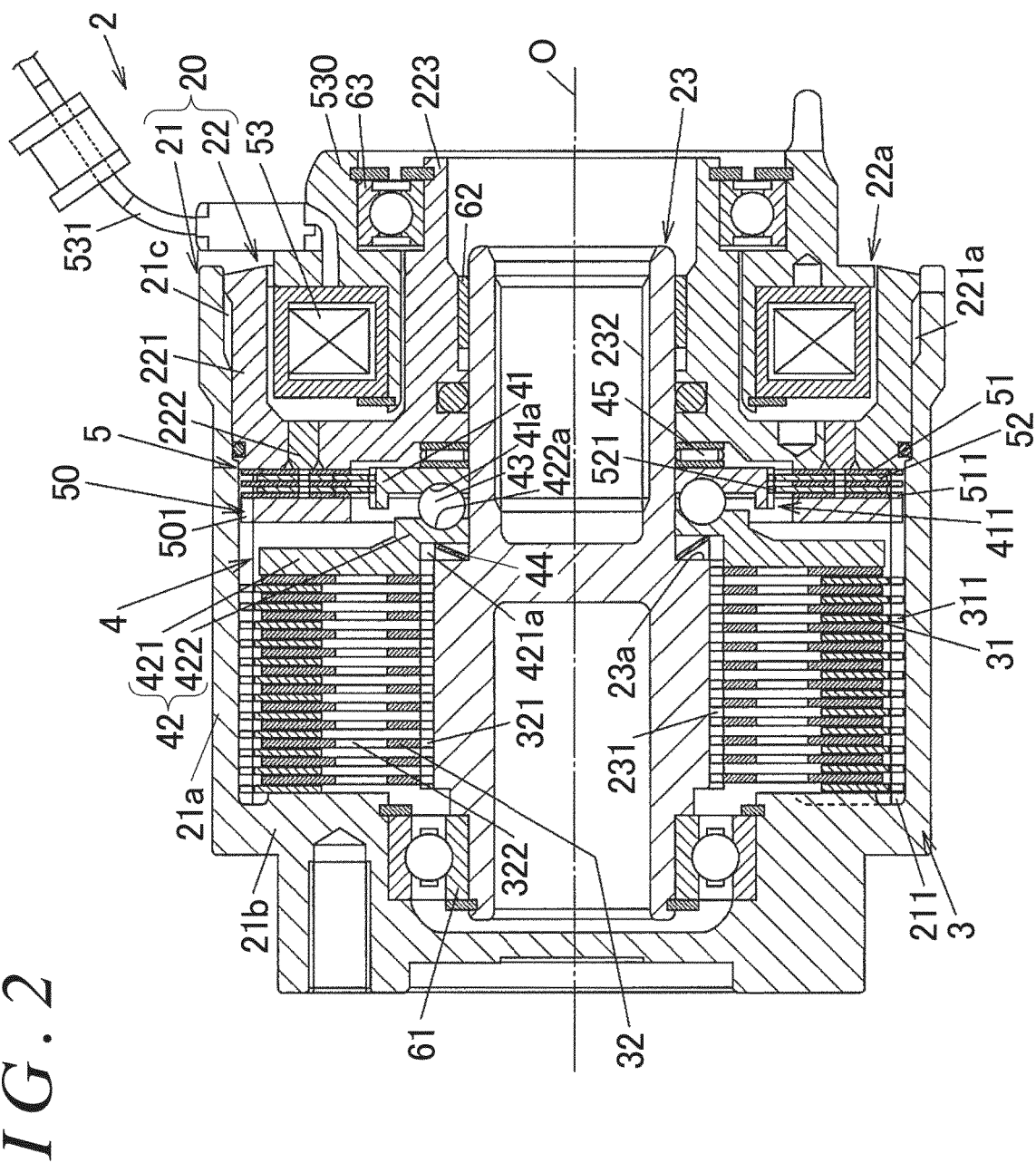
FIG. 2 is a sectional view illustrating an example of the configuration of the drive force transfer device.

FIG. 2 is a sectional view illustrating an example of the configuration of the drive force transfer device 2. In FIG. 2, the area above a rotational axis O indicates the drive force transfer device 2 in an operating state (torque transfer state), and the area below the rotational axis O indicates the drive force transfer device 2 in a non-operating state (non-torque transfer state). Hereinafter, the direction parallel to the rotational axis O will be referred to as the "axial direction".

The drive force transfer device 2 has the housing 20, the tubular inner shaft 23, a main clutch 3, a cam mechanism 4, and an electromagnetic clutch mechanism 5. The housing 20 serves as an outer rotary member constituted from a front housing 21 and a rear housing 22. The inner shaft 23 serves as an inner rotary member supported coaxially with and so as to be rotatable relative to the housing 20. The main clutch 3 transfers a drive force between the housing 20 and the inner shaft 23. The cam mechanism 4 generates a pressing force for pressing the main clutch 3. The electromagnetic clutch mechanism 5 receives a rotational force of the front housing 21 to cause the cam mechanism 4 to operate. Lubricating oil (not illustrated) is sealed in an internal space of the housing 20. The cam mechanism 4 is an embodiment of a pressing mechanism that applies a pressing force to the main clutch 3.

The front housing 21 has a bottomed cylindrical shape in which a cylindrical tubular portion 21a and a bottom portion 21b are integral with each other. A female thread portion 21c is formed in the inner surface of the opening end portion of the tubular portion 21a. The front housing 21 is made of a non-magnetic metal material such as aluminum. The propeller shaft 14 (see FIG. 1) is coupled to the bottom portion 21b via a cruciform joint, for example.

The front housing 21 has a plurality of outer spline protrusions 211 provided on the inner peripheral surface of the tubular portion 21a such that the outer spline protrusions 211 extend in the axial direction. The outer spline protrusions 211 project radially inward toward the rotational axis O (illustrated in FIG. 1) of the housing 20 and the inner shaft 23.

The rear housing 22 is composed of a first annular member 221, a second annular member 222, and a third annular member 223. The first annular member 221 is made of a magnetic material such as iron. The second annular member 222 is made of a non-magnetic material such as austenitic stainless steel, and integrally coupled to the inner peripheral side of the first annular member 221 by welding or the like. The third annular member 223 is made of a magnetic material such as iron, and integrally coupled to the inner peripheral side of the second annular member 222 by welding or the like. An annular housing space 22a that houses an electromagnetic coil 53 is formed between the first annular member 221 and the third annular member 223. A male thread portion 221a threadably engaged with the female thread portion 21c of the front housing 21 is formed on the outer peripheral surface of the first annular member 221.

The inner shaft 23 is supported on the inner peripheral side of the housing 20 by a ball bearing 61 and a needle roller bearing 62. The inner shaft 23 has a plurality of inner spline protrusions 231 formed on the outer peripheral surface thereof such that the inner spline protrusions 231 extend in the axial direction. A spline fitting portion 232 is formed on the inner surface of one end portion of the inner shaft 23. One end portion of the pinion gear shaft 150 (see FIG. 1) is fitted with the spline fitting portion 232 so as not to be relatively rotatable.

The main clutch 3 is a friction clutch that has a plurality of main outer clutch plates 31 and a plurality of main inner clutch plates 32 disposed alternately along the axial direction. Frictional sliding between the main outer clutch plates 31 and the main inner clutch plates 32 is lubricated by lubricating oil (not illustrated) sealed between the housing 20 and the inner shaft 23 to suppress wear and seizure.

The main outer clutch plates 31 have a plurality of engagement protrusions 311 provided at the outer peripheral end portions thereof and engaged with the outer spline protrusions 211 of the front housing 21. Rotation of the main outer clutch plates 31 relative to the front housing 21 is restricted with the engagement protrusions 311 engaged with the outer spline protrusions 211, and the main outer clutch plates 31 are movable in the axial direction with respect to the front housing 21.

The main inner clutch plates 32 have a plurality of engagement protrusions 321 provided at the inner peripheral end portions thereof and engaged with the inner spline protrusions 231 of the inner shaft 23 with a backlash in the circumferential direction. A plurality of oil holes 322 that allow passage of lubricating oil are formed in the main inner clutch plates 32 on the inner side with respect to the main outer clutch plates 31. Rotation of the main inner clutch plates 32 relative to the inner shaft 23 is restricted with the engagement protrusions 321 engaged with the inner spline protrusions 231, and the main inner clutch plates 32 are movable with respect to the inner shaft 23 in the axial direction.

The cam mechanism 4 has a pilot cam 41, a main cam 42, and a plurality of spherical cam balls 43. The pilot cam 41 receives a rotational force of the housing 20 via the electromagnetic clutch mechanism 5. The main cam 42 serves as a pressing member that presses the main clutch 3 in the axial direction. The cam balls 43 are disposed between the pilot cam 41 and the main cam 42.

The main cam 42 integrally has a pressing portion 421 in an annular plate shape and a cam portion 422. The pressing portion 421 contacts the main inner clutch plate 32 at one end of the main clutch 3 to press the main clutch 3. The cam portion 422 is provided on the inner peripheral side of the main cam 42 with respect to the pressing portion 421. Rotation of the main cam 42 relative to the inner shaft 23 is restricted with a spline engagement portion 421a formed at the inner peripheral end portion of the pressing portion 421 engaged with the inner spline protrusions 231 of the inner shaft 23. The main cam 42 is urged away from the main clutch 3 in the axial direction by a disc spring 44 disposed between a stepped surface 23a formed on the inner shaft 23 and the main cam 42.

The pilot cam 41 has a spline engagement portion 411 at the outer peripheral end portion thereof. The spline engagement portion 411 receives a rotational force for rotation relative to the main cam 42 from the electromagnetic clutch mechanism 5. A needle roller thrust bearing 45 is disposed between the pilot cam 41 and the third annular member 223 of the rear housing 22.

A plurality of cam grooves 41a and 422a are formed in opposing surfaces of the pilot cam 41 and the cam portion 422 of the main cam 42. The depths of the cam grooves 41a and 422a in the axial direction are varied along the circumferential direction. The cam balls 43 are each disposed between the cam groove 41a of the pilot cam 41 and the cam groove 422a of the main cam 42. The cam mechanism 4 generates a pressing force in the axial direction for pressing the main clutch 3 when the pilot cam 41 rotates relative to the main cam 42. The main clutch 3 transfers a drive force using a friction force when the main clutch 3 receives the pressing force from the cam mechanism 4 and the main outer clutch plates 31 and the main inner clutch plates 32 are brought into frictional contact with each other.

The electromagnetic clutch mechanism 5 has an armature 50, a plurality of pilot outer clutch plates 51, a plurality of pilot inner clutch plates 52, and the electromagnetic coil 53.

The electromagnetic coil 53 is held by an annular yoke 530 made of a magnetic material, and housed in the housing space 22a of the rear housing 22. The yoke 530 is supported on the third annular member 223 of the rear housing 22 by a ball bearing 63, with the outer peripheral surface of the yoke 530 opposing the inner peripheral surface of the first annular member 221. The inner peripheral surface of the yoke 530 opposes the outer peripheral surface of the third annular member 223. An exciting current is supplied from the control device 10 to the electromagnetic coil 53 via a wire 531.

The pilot outer clutch plates 51 and the pilot inner clutch plates 52 are disposed alternately along the axial direction between the armature 50 and the rear housing 22. A plurality of arcuate slits are formed in the center portions, in the radial direction, of the pilot outer clutch plates 51 and the pilot inner clutch plates 52. The slits prevent short-circuiting of magnetic flux generated by energization of the electromagnetic coil 53.

The pilot outer clutch plates 51 have a plurality of engagement protrusions 511 provided at the outer peripheral end portions thereof and engaged with the outer spline protrusions 211 of the front housing 21. The pilot inner clutch plates 52 have a plurality of engagement protrusions 521 provided at the inner peripheral end portions thereof and engaged with the spline engagement portion 411 of the pilot cam 41.

The armature 50 is an annular member made of a magnetic material such as iron. A plurality of engagement protrusions 501 engaged with the outer spline protrusions 211 of the front housing 21 are formed on the outer peripheral portion of the armature 50. Consequently, the armature 50 is movable in the axial direction with respect to the front housing 21, and rotation of the armature 50 relative to the front housing 21 is restricted.

In the drive force transfer device 2 configured as described above, the armature 50 is attracted toward the rear housing 22 by a magnetic force generated when an exciting current is supplied to the electromagnetic coil 53, and the pilot outer clutch plates 51 and the pilot inner clutch plates 52 are brought into frictional contact with each other. Consequently, a rotational force of the housing 20 is transferred to the pilot cam 41, the pilot cam 41 is rotated relative to the main cam 42, and the cam balls 43 are rolled in the cam grooves 41a and 422a. With the cam balls 43 rolling, cam thrust that presses the main clutch 3 is generated in the main cam 42, and a friction force is generated between the main outer clutch plates 31 and the main inner clutch plates 32. Torque is transferred between the housing 20 and the inner shaft 23 using the friction force. Torque transferred by the main clutch 3 is increased and decreased in accordance with the exciting current which is supplied to the electromagnetic coil 53.

The control device 10 has a CPU 101 and a storage unit 102. The CPU 101 serves as a computation processing device. The storage unit 102 is composed of a semiconductor storage element such as a ROM and a RAM. The CPU 101 executes a program stored in the storage unit 102.

Figure 3:
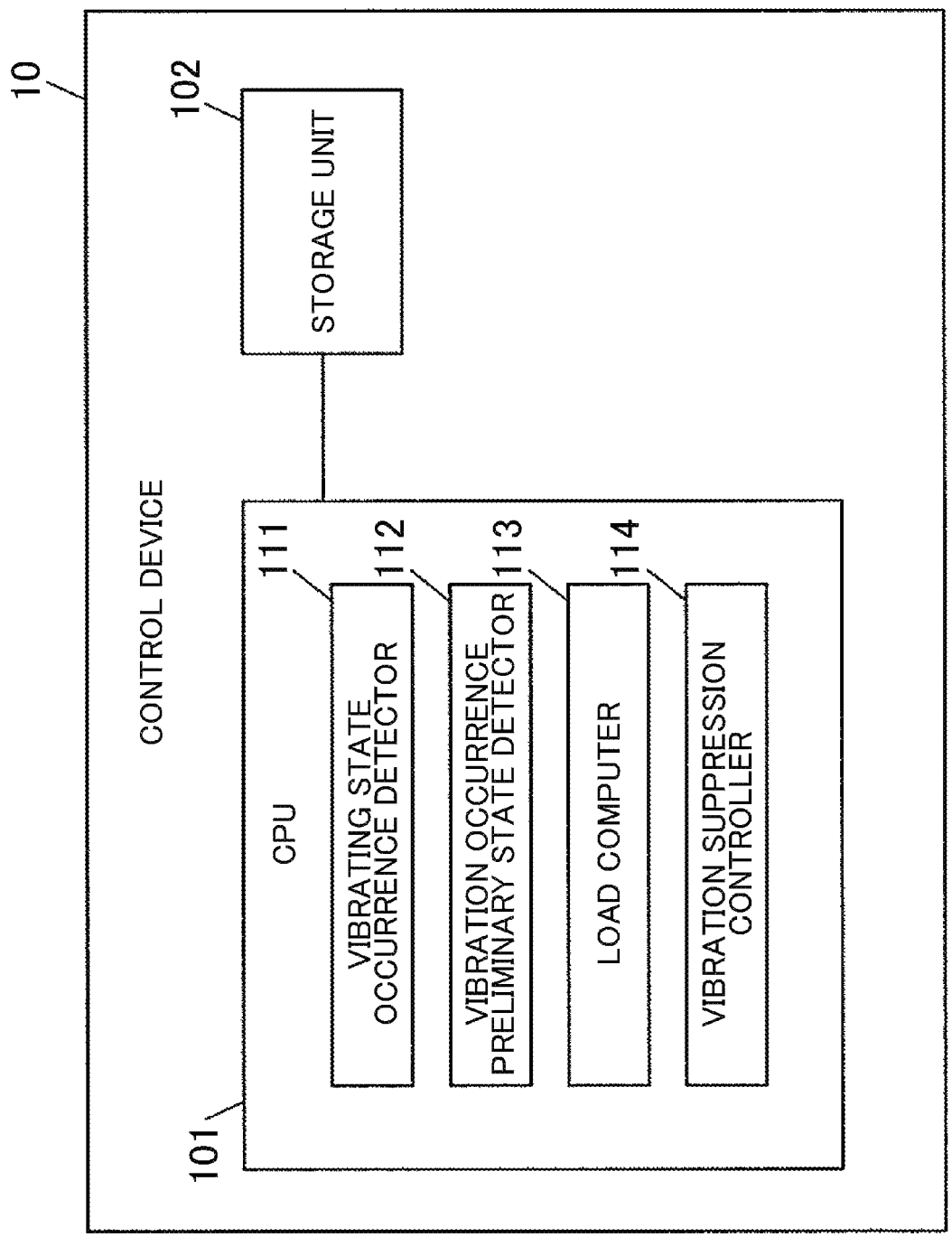
FIG. 3 is a functional block diagram illustrating the functional configuration of a control device.

FIG. 3 is a functional block diagram illustrating the functional configuration of the control device 10. By executing the program stored in the storage unit 102, the CPU 101 functions as a vibrating state occurrence detector 111, a vibration occurrence preliminary state detector 112, a load computer 113, and a vibration suppression controller 114.

The control device 10 has many functions other than the functions implemented by such components. However, the following description will focus on two types of processing: processing for suppressing a vibrating state in which a state (hereinafter referred to as "front-wheel slip") in which slip occurs at at least one of the right and left front wheels 182 and 181 (at least one of the right front wheel 182 and the left front wheel 181) and a state (hereinafter referred to as "rear-wheel slip") in which slip occurs at at least one of the right and left rear wheels 192 and 191 (at least one of the right rear wheel 192 and the left rear wheel 191) occur alternately when the four-wheel-drive vehicle 1 starts; and processing for preventing the drive force transfer device 2 from being overloaded during the processing for suppressing the vibrating state.

The front-wheel slip can be detected when the rotational speed of the right front wheel 182 or the rotational speed of the left front wheel 181 is abruptly increased during 40 ms, for example. Similarly, the rear-wheel slip can be detected when the rotational speed of the right rear wheel 192 or the rotational speed of the left rear wheel 191 is abruptly increased during 40 ms, for example.

Such a vibrating state may be caused in the case where the vehicle starts in a four-wheel-drive state on a road surface with a low friction coefficient such as an icy road, a compacted snow road, or the like, for example. More specifically, when rotation of the engine 11 is output as a drive force with the speed of the rotation varied by the transmission 12 in the four-wheel-drive state, the drive force is distributed generally equally to the right and left front wheels 182 and 181 and the right and left rear wheels 192 and 191. In this state, however, when front-wheel slip occurs, for example, substantially no drive force is transmitted to the right and left front wheels 182 and 181, and a large portion of the drive force is transferred to the right and left rear wheels 192 and 191. Consequently, the rear-wheel drive shafts 171 and 172 are twisted. In other words, an elastic force is accumulated in the rear-wheel drive shafts 171 and 172. Rear-wheel slip occurs when the twisting force exceeds a friction force (static friction force) between the right and left rear wheels 192 and 191 and the road surface. On the other hand, the front-wheel slip is gradually reduced as the drive force which is transferred to the right and left front wheels 182 and 181 is decreased.

When rear-wheel slip occurs, conversely to the time when front-wheel slip occurs, substantially no drive force is transferred to the right and left rear wheels 192 and 191, and a large portion of the drive force is transferred to the right and left front wheels 182 and 181, slip of which has been gradually reduced. Consequently, the front-wheel drive shafts 161 and 162 are twisted, and front-wheel slip occurs again when the twisting force exceeds a friction force between the right and left front wheels 182 and 181 and the road surface. By repeating such processing, the vibrating state is continued with the four-wheel-drive vehicle 1 remaining unable to start.

In order to prevent continuation of the vibrating state, it is desirable to reduce the fastening force of the main clutch 3 of the drive force transfer device 2, and to suppress the occurrence of twisting that is large enough to cause slip of the front-wheel drive shafts 161 and 162 and the rear-wheel drive shafts 171 and 172. In the case where excessive front-wheel slip is caused by reducing the fastening force of the main clutch 3, however, the main outer clutch plates 31 and the main inner clutch plates 32 frictionally slide on each other while being pressed against each other, and thus the main clutch 3 is heated, which may damage frictional materials applied to the main outer clutch plates 31, for example. In the embodiment, such damage to the drive force transfer device 2 is prevented by control processing discussed below.

The vibrating state occurrence detector 111 detects the occurrence of a vibrating state in which the right and left front wheels 182 and 181 and the right and left rear wheels 192 and 191 slip alternately in the four-wheel-drive state in which a drive force of the engine 11 is transferred to the right and left rear wheels 192 and 191 with the main clutch 3 of the drive force transfer device 2 engaged. The vibration occurrence preliminary state detector 112 detects the occurrence of a preliminary state in which a vibrating state, in which the right and left front wheels 182 and 181 and the right and left rear wheels 192 and 191 slip alternately, may occur.

The vibrating state occurrence detector 111 detects the occurrence of a vibrating state in accordance with the occurrence of $\Delta N$ vibration in which a rotational speed difference (hereinafter referred to as "$\Delta N$") obtained by subtracting the average rotational speed of the right and left rear wheels 192 and 191 from the average rotational speed of the right and left front wheels 182 and 181 becomes positive and negative cyclically.

Figure 4:
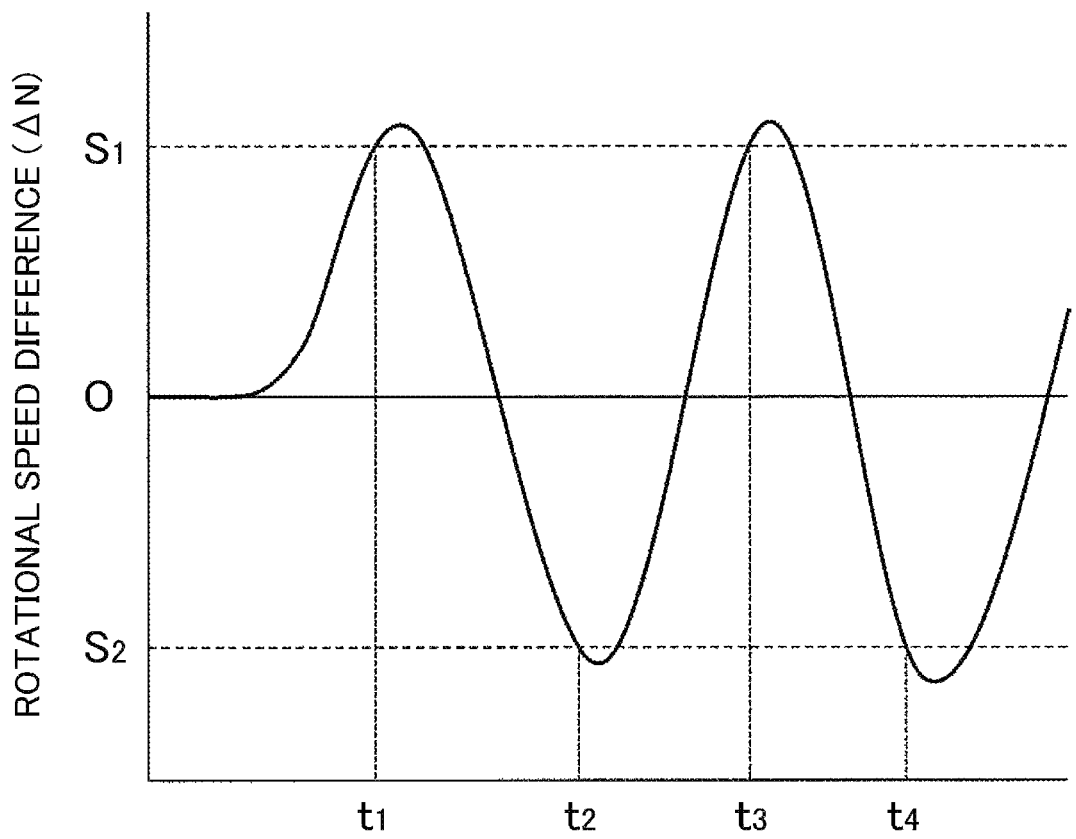
FIG. 4 is a graph that indicates an example of a state in which ΔN vibration occurs.

FIG. 4 is a graph that indicates an example of a state in which $\Delta N$ vibration occurs. The horizontal axis indicates the time, and the vertical axis indicates $\Delta N$. The vibrating state occurrence detector 111 determines that $\Delta N$ vibration has occurred when $\Delta N$ becomes more than a positive predetermined value S1, $\Delta N$ becomes less than a negative predetermined value S2 within a predetermined period thereafter, $\Delta N$ becomes more than the positive predetermined value S1 within the predetermined period further thereafter, and such an event occurs repeatedly a plurality of (e.g. three) times. That is, the vibrating state occurrence detector 111 detects the occurrence of a vibrating state. The predetermined period is 50 to 150 ms, for example. The absolute values of the predetermined values S1 and S2 are 70 rpm, for example.

In the example illustrated in FIG. 4, $\Delta N$ becomes more than the positive predetermined value S1 at times t1 and t3, and $\Delta N$ becomes less than the negative predetermined value S2 at times t2 and t4. If a period from time t1 to time t2 and a period from time t2 to time t3 are within the predetermined period, the above event has occurred once during a period from time t1 to time t3.

The vibration occurrence preliminary state detector 112 detects the occurrence of a preliminary state in the case where excessive slip has occurred at at least one of the right and left rear wheels 192 and 191 or in the case where slip has occurred at at least one of the right and left rear wheels 192 and 191 immediately after slip has occurred at at least one of the right and left front wheels 182 and 181. In the former case, more specifically, the vibration occurrence preliminary state detector 112 determines that excessive rear-wheel slip has occurred when the average rotational speed of the right and left rear wheels 192 and 191 is higher than the average rotational speed of the right and left front wheels 182 and 181 by 100 rpm or more, for example. Meanwhile, in the latter case, more specifically, the vibration occurrence preliminary state detector 112 detects that a preliminary state has occurred when rear-wheel slip has occurred within 0.2 seconds, for example, since the occurrence of front-wheel slip.

Figure 5:
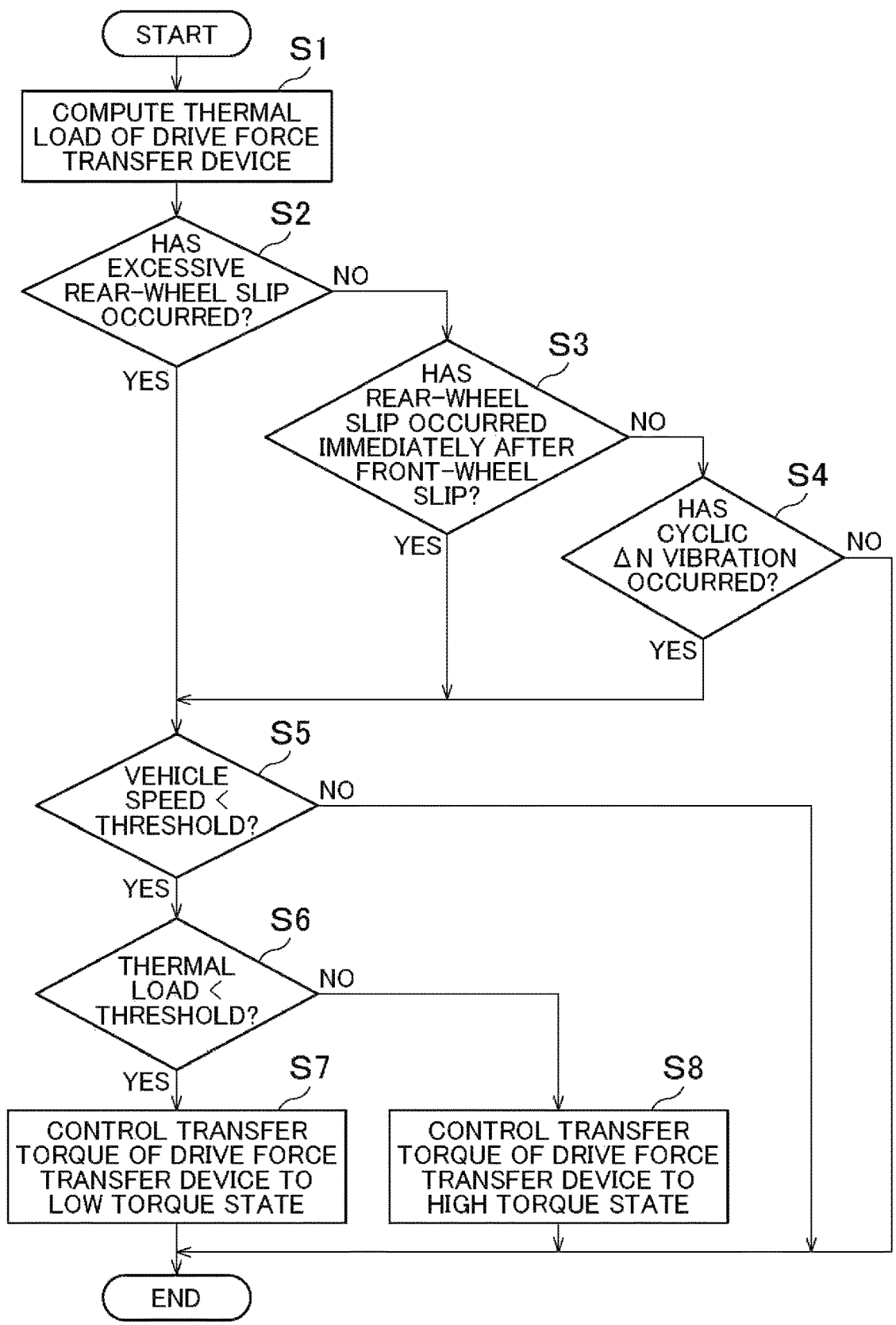
FIG. 5 is a flowchart illustrating an example of the procedure of processing executed by the control device.

FIG. 5 is a flowchart illustrating an example of the execution procedure of processing executed by the CPU 101 as the vibrating state occurrence detector 111, the vibration occurrence preliminary state detector 112, the load computer 113, and the vibration suppression controller 114. The CPU 101 repeatedly executes the processing illustrated in the flowchart in predetermined control cycles (e.g. in cycles of 5 ms).

In the case where the four-wheel-drive vehicle 1 has not started (the vehicle speed is zero), the electromagnetic coil 53 of the drive force transfer device 2 has been supplied in advance with an exciting current that generates a fastening force of the main clutch 3 that is not enough to cause relative rotation between the housing 20 and the inner shaft 23. Hereinafter, a state in which the electromagnetic coil 53 is supplied with such an exciting current will be referred to as a "high torque state" of the drive force transfer device 2. Meanwhile, a state in which the electromagnetic coil 53 is supplied with an exciting current that is enough to cause relative rotation between the housing 20 and the inner shaft 23 will be referred to as a "low torque state" of the drive force transfer device 2.

In one control cycle, first, the CPU 101 serves as the load computer 113, and computes a thermal load of the drive force transfer device 2 (step S1). The thermal load can be calculated by integrating, over a predetermined period, a value obtained by subtracting the amount of heat to be released, which is calculated in consideration of the outside temperature, from the amount of heat to be generated, which is calculated by multiplying transfer torque of the drive force transfer device 2 which matches the exciting current by the absolute value of ΔN, for example. Alternatively, in the case where a temperature sensor is attached to the drive force transfer device 2, the thermal load may be calculated on the basis of a value detected by the temperature sensor.

Next, the CPU 101 serves as the vibration occurrence preliminary state detector 112, and determines whether or not excessive rear-wheel slip has occurred (step S2). In the case where it is determined that excessive rear-wheel slip has not occurred (S2: No), the CPU 101 serves as the vibration occurrence preliminary state detector 112, and determines whether or not rear-wheel slip has occurred immediately after front-wheel slip (step S3). In the case where it is determined that rear-wheel slip has not occurred immediately after front-wheel slip (S3: No), the CPU 101 serves as the vibrating state occurrence detector 111, and determines whether or not cyclic ΔN vibration has occurred (step S4). As a result of the determination (S4: No), in the case where cyclic ΔN vibration has not occurred, the processing of the flowchart illustrated in FIG. 5 is ended.

On the other hand, in the case where it is determined that excessive rear-wheel slip has occurred (S2: Yes), in the case where it is determined that rear-wheel slip has occurred immediately after front-wheel slip (S3: Yes), or in the case where it is determined that cyclic ΔN vibration has occurred (S4: Yes), the CPU 101 determines whether or not the vehicle speed is less than a predetermined threshold (step S5). The threshold used in step S5 is 30 km/h, for example. The vehicle speed can be calculated on the basis of the rotational speed of a wheel at the lowest rotational speed, among the right and left front wheels 182 and 181 and the right and left rear wheels 192 and 191, for example. In the case where the vehicle speed is equal to or more than the predetermined threshold (S5: No), the processing of the flowchart illustrated in FIG. 5 is ended.

In the case where it is determined in the processing in step S5 that the vehicle speed is less than the predetermined threshold (S5: Yes), the CPU 101 determines whether or not the thermal load of the drive force transfer device 2 computed in step S1 is less than a predetermined threshold (step S6). The threshold used in step S6 is set such that a portion of the drive force transfer device 2 that is the most sensitive to heat, e.g. the friction materials which are applied to the main outer clutch plates 31, is not damaged by overheating.

In the case where it is determined in the processing of step S6 that the thermal load of the drive force transfer device 2 is less than the predetermined threshold (S6: Yes), the CPU 101 controls the drive force transfer device 2 to the low torque state (step S7). Specifically, the CPU 101 reduces the exciting current to be supplied to the electromagnetic coil 53 to about half of that in the high torque state, for example. Through this processing, the fastening force of the main clutch 3 is weakened, which loosens coupling between the propeller shaft 14, which is a drive force transfer member closer to the front wheels than the drive force transfer device 2, and the pinion gear shaft 150, which is a drive force transfer member closer to the rear wheels than the drive force transfer device 2. Therefore, accumulation of twisting in the front-wheel drive shafts 161 and 162 and the rear-wheel drive shafts 171 and 172 is suppressed, so that ΔN vibration is suppressed.

In the case where the thermal load of the drive force transfer device 2 is not less than the predetermined threshold in the processing of step S6 (S6: No), on the other hand, the CPU 101 controls the drive force transfer device 2 to the high torque state (step S8). Through this processing, the electromagnetic coil 53 is supplied with an exciting current that is not enough to cause the main outer clutch plates 31 and the main inner clutch plates 32 to frictionally slide on each other when the thermal load of the drive force transfer device 2 becomes high because of continuous occurrence of ΔN vibration, for example. Consequently, a further increase of the thermal load of the drive force transfer device 2 is suppressed, and damage due to heat is avoided.

The processing in steps S5 to S8 is executed with the CPU 101 serving as the vibration suppression controller 114.

As described above, the control device 10 reduces the drive force which is transferred to the right and left rear wheels 192 and 191 via the drive force transfer device 2 on condition that the thermal load of the drive force transfer device 2 is less than the predetermined threshold when a vibrating state or a preliminary state therefor is detected. This processing is performed in consideration of a fact that slipping tends to occur between the main outer clutch plates 31 and the main inner clutch plates 32, and damage due to overheating tends to occur with the thermal load of the drive force transfer device 2 further increased, if the fastening force of the main clutch 3 is weakened when the thermal load of the drive force transfer device 2 is high.

The control device 10 reduces the drive force which is transferred to the right and left rear wheels 192 and 191 via the drive force transfer device 2 when a vibrating state or a preliminary state therefor is detected further on condition that the vehicle speed is less than the predetermined threshold. This processing is for the purpose of giving priority to the travel stability of the four-wheel-drive vehicle 1 in consideration of a fact that vibration that is enough to give a sense of discomfort or a sense of anxiety to a driver or a passenger occurs even if $\Delta N$ vibration occurs at the time other than starting.

According to the embodiment described above, it is possible to prevent damage, due to the thermal load, to the drive force transfer device 2 while suppressing a vibrating state, in which the right and left front wheels 182 and 181 and the right and left rear wheels 192 and 191 slip alternately, by reducing transfer torque of the drive force transfer device 2 even if the vibrating state occurs when the vehicle starts on a road surface with a low friction coefficient.

What is claimed is:

1. A four-wheel-drive vehicle control device mounted on a four-wheel-drive vehicle that has main drive wheels, to which a drive force of a drive source of the vehicle is always transferred, and auxiliary drive wheels, to which a drive force of the drive source is transferred via a drive force transfer device so as to be adjustable in accordance with a travel state of the vehicle, the four-wheel-drive vehicle control device controlling the drive force transfer device and comprising:
   a detector that detects occurrence of a vibrating state, in which the main drive wheels and the auxiliary drive wheels slip alternately for a predetermined number of cycles in a four-wheel-drive state in which a drive force is transferred to the auxiliary drive wheels; and
   a vibration suppression controller that reduces the drive force which is transferred to the auxiliary drive wheels via the drive force transfer device when the vibrating state is detected by the detector, wherein
   the detector detects the vibrating state when a sequence repeats a predetermined amount of times, the sequence including a speed difference of the main drive wheels and the auxiliary drive wheels being greater than a positive first predetermined speed, followed by the speed difference of the main drive wheels and the auxiliary drive wheels being less than a negative second predetermined speed within a first time period, and followed by the speed difference of the main drive wheels and the auxiliary drive wheels being greater than the positive first predetermined speed within a second time period,
   the vibration suppression controller is configured to reduce the drive force which is transferred to the auxiliary drive wheels on condition that a thermal load of the drive force transfer device is less than a thermal threshold, and
   the vibration suppression controller is configured to determine the thermal load based on the speed difference of the main drive wheels and the auxiliary drive wheels and the drive force transferred by the drive force transfer device.

2. The four-wheel-drive vehicle control device according to claim 1, wherein the vibration suppression controller is configured to reduce the drive force which is transferred to the auxiliary drive wheels further on condition that a vehicle speed is less than a speed threshold when the vibrating state or the preliminary state is detected by the detector.

3. The four-wheel-drive vehicle control device according to claim 1, wherein
   the vibration suppression controller is configured to determine the thermal load based by subtracting an amount of heat to be released determined based on an ambient temperature from an amount of heat to be generated determined by multiplying the speed difference of the main drive wheels and the auxiliary drive wheels by the drive force transferred by the drive force transfer device.

4. The four-wheel-drive vehicle control device according to claim 1, wherein
   an absolute value of the first predetermined speed and the second predetermined speed is 70 RPM.

* * * * *